(12) United States Patent
Douglas et al.

(10) Patent No.: US 6,484,574 B1
(45) Date of Patent: Nov. 26, 2002

(54) WHEEL BALANCER APPARATUS WITH IMPROVED IMBALANCE CORRECTION WEIGHT POSITIONING

(75) Inventors: Michael Douglas, St. Peters, MO (US); Nicholas J. Colarelli, III, Creve Coeur, MO (US)

(73) Assignee: Hünter Engineering Company, Bridgeton, MO (US)

( * ) Notice: Subject to any disclaimer, the term of this patent is extended or adjusted under 35 U.S.C. 154(b) by 53 days.

(21) Appl. No.: 09/708,773

(22) Filed: Nov. 8, 2000

(51) Int. Cl.[7] ............................................... G01M 1/38
(52) U.S. Cl. ........................................ 73/462; 301/5.21
(58) Field of Search ......................... 73/462, 460, 466, 73/467; 301/5.21, 5.22; 702/56

(56) References Cited

U.S. PATENT DOCUMENTS

| | | | | |
|---|---|---|---|---|
| 4,160,384 A | * | 7/1979 | Guyot et al. | 73/462 |
| 4,480,471 A | * | 11/1984 | Kogler et al. | 73/462 |
| 5,969,247 A | * | 10/1999 | Carter et al. | 73/462 |
| 6,244,108 B1 | | 6/2001 | McInnes et al. | |

FOREIGN PATENT DOCUMENTS

| | | |
|---|---|---|
| IT | 98A000047 | 9/1998 |
| WO | WO 97/28431 | 8/1997 |
| WO | WO 98/10261 | 3/1998 |

OTHER PUBLICATIONS

MT 2900 Ergo Laser (1 page double sided).

* cited by examiner

*Primary Examiner*—Helen Kwok
(74) *Attorney, Agent, or Firm*—Polster, Lieder, Woodruff & Lucchesi, L.C.

(57) ABSTRACT

A balancer for a wheel rim/tire assembly, including a rotation sensor assembly for measuring rotation, and a motor operatively connected for rotating the wheel rim/tire assembly. A control circuit controls the motor to actively hold the wheel rim/tire assembly at a desired rotational position. A rim measuring apparatus is configured to scan the inner surface of the wheel rim/tire assembly. The optimum plane locations, amounts of correction weights, and the number of correction weights, are calculated by the control circuit to result in a minimized residual static and dynamic imbalance. The control circuit utilizes the motor drive to automatically index and hold the wheel rim/tire assembly at the proper rotational position for placement of an imbalance correction weight, and a laser pointer illuminates the surface of the wheel rim/tire assembly at the axial position of the weight imbalance correction plane at which the imbalance correction weight is to be applied.

22 Claims, 5 Drawing Sheets

WHEEL BALANCER APPARATUS WITH IMPROVED IMBALANCE CORRECTION WEIGHT POSITIONING

CROSS-REFERENCE TO RELATED APPLICATIONS

None.

STATEMENT REGARDING FEDERALLY SPONSORED RESEARCH OR DEVELOPMENT

Not Applicable.

BACKGROUND OF THE INVENTION

This invention relates to wheel balancers and in particular to an improved wheel balancer including a wheel rim measurement device configured to map the inner surface of a wheel rim, a wheel rim rotational positioning device, and a correction weight placement indicator, each operating in conjunction to facilitate the proper placement of wheel imbalance correction weights on the wheel rim.

When balancing a vehicle wheel, several potential sources for operator error exist. First, there is a need to identify the proper correction planes on the wheel rim into which correction weights are to be placed. Second, the wheel rim must be correctly rotated to, and held in, a rotational position such that the operator can place an imbalance correction weight in the identified correction plane, and third, the operator must manually apply the imbalance correction weight to the wheel rim in the identified correction plane and at the proper rotational position.

As disclosed in WO Patent No. 97/28431 to Hunter Engineering Company for "Wheel Balancer With Servo Motor", herein incorporated by reference, the determination of unbalance in vehicle wheels is carried out by an analysis with reference to phase and amplitude of the mechanical vibrations caused by rotating unbalanced masses in the wheel. The mechanical vibrations are measured as motions, forces, or pressures by means of transducers, which convert the mechanical vibrations to electrical signals. Each signal is the combination of fundamental oscillations caused by imbalance and noise.

It is well known in the art that a variety of types of imbalance correction weights are available for placing on the wheel to correct the measured imbalance. For example, adhesive-backed weights, patch balance weights and hammer-on weights are available from a number of different manufacturers. Most balancers assume that the wheel rim/tire assembly will be rotated to a particular rotational position (for example, disposing the desired weight correction position at the top (twelve o'clock) or bottom (six o'clock) rotational positions) for weight placement. This is generally not a problem, unless it would be more convenient to apply the weight with the wheel/tire assembly in a different orientation, for example, the four-five o'clock rotational position when the operator is standing facing the surface of the wheel mounted on the wheel balancer.

As described in the WO 97/28431 patent, drive systems for currently available balancers may be improved to aid in weight placement by automatically rotating and holding the wheel rim to the correct rotational position. Prior art balancers typically require the operator to manually rotate the wheel/tire assembly to the desired position for weight placement. These prior art balancers then use a manual brake or the application of rectified AC current to an AC induction motor to temporarily hold the shaft in the desired position. Manual rotation to the desired position is less than satisfactory since it requires the operator to interpret the balancer display correctly. Moreover, manual rotation itself is not desirable, since it ties up the operator's time and attention. In conventional systems, the balancer motor cannot be used to rotate the wheel/tire assembly to the correct position since available motor controllers used in balancers are incapable of performing this function.

Using the motor itself to provide a braking action is not completely satisfactory either. Such braking is normally accomplished by applying rectified alternating current to an AC motor. This method is inherently subject to error. The actual stopping position may be incorrect if the tire is larger than average or turning too fast for the "brake" to respond. Moreover, although currently available motor braking systems stop the wheel in approximately the correct position, they do not actual hold the tire in position since the motor would heat up if the "brake" was left on. With conventional equipment, a wheel rim/tire assembly with sufficient static imbalance to overcome its own inertia, therefore, can roll away from the braked dynamic weight attachment position as soon as the braking energy is released.

Similarly, currently available balancers require that the wheel rim/tire assembly be manually rotated in practically all circumstances since those balancers have no capability for applying anything other than full power to the balancer motor. That is, the motor in conventional balancers is useful for accelerating the wheel/tire assembly to full speed for determining wheel imbalance, but not for accurately positioning the wheel/tire assembly subsequently for correction of that imbalance.

Accordingly, WO Patent No. 97/28431 discloses a wheel balancer including a shaft adapted for receiving a wheel/tire assembly, having a longitudinal axis and which is rotatable about the axis by a direct current motor so as to rotate a wheel/tire assembly removably mounted thereon. A rotation sensor assembly is provided for measuring rotation of the shaft about its longitudinal axis and a vibration sensor assembly is operatively connected to the shaft for measuring vibrations resulting from imbalance in the wheel rim/tire assembly. A control circuit controls the application of direct current to the direct current motor and determines from vibrations measured by the vibration sensor assembly at least one weight placement position on the wheel/tire assembly to correct the vibrations. The control circuit is responsive to determination of a weight placement position to controllably rotate the wheel rim/tire assembly to bring the weight placement position to a predetermined rotational location and to actively hold the wheel/tire assembly in that location. However, it remains up to the operator to correctly position the correction weight on the wheel rim surface.

To compensate for a combination of static imbalance (where the heaviest part of the assembly will seek a position directly below the mounting shaft) and couple imbalance (where the assembly upon rotation causes torsional vibrations on the mounting shaft), at least two correction weights are required which are separated axially along the wheel surface, coincident with weight location or imbalance correction "planes". For using clip-on weights the "left plane" comprises the left (innermost) rim lip circumference while the "right plane" comprises the right rim lip. If adhesive weights are used, the planes can reside anywhere between the rim lips, barring physical obstruction such as wheel spokes, welds, and regions of excessive curvature.

With the wheel rim/tire assembly mounted to the balancer, the relative distances from a reference plane (usually the surface of the wheel mounting hub) to the planes are conventionally made known either by manually measuring with pull-out gauges and calipers and then entering the observed values through a keypad, potentiometer, or digital encoder, or by using an automatic electronic measuring apparatus. The radius at which the weights will be placed must also be entered, again either manually or by use of the electronic measuring apparatus. Conventional wheel balancers employ a computer configured to utilize this input weight plane information, together with variable weight amounts and variable radial placements, to identify the proper locations for the imbalance correction weights on the wheel rim. While utilization of such a system facilitates the placement of an imbalance correction weight by placing the vehicle wheel in a preferred, or optimal rotational position for weight placement, it does not reduce other sources of operator error, such as the placement of an imbalance weight in the incorrect balance plane, a poor selection of imbalance planes by the operator, or failure to compensate for the width of the installed imbalance weights.

U.S. Pat. No. 5,915,274 to Douglas for "Method of Correcting Imbalance on a Motor Vehicle Wheel," herein incorporated by reference, overcomes some of the problems associated with correctly determining the weight location "planes" by providing an apparatus for mapping the surface of the wheel rim. The rim measuring apparatus scans and stores the contour of the surface of the wheel rim, allowing the balancer computer to identify optimal imbalance correction weight planes, and to present the operator with the best imbalance correction weight arrangement. The computer has effectively an infinite number of imbalance correction planes in which to place the correction weights, rather than only the two planes previously selected by the operator. The best plane locations, amount of weight, and even the number of weights, are calculated to result in a minimized residual static and dynamic imbalance while still using incrementally sized weights. A display on the balancer is used to show the actual scanned contour of the wheel, as well as the relative locations of the weights on the display wheel rim, enhancing user understanding and providing confidence that the measuring apparatus is working correctly. However, actual placement of the imbalance correction weights in the identified optimal balance correction planes, and at the ideal rotational positions, must still be done manually by an operator, guided by instructions displayed on the wheel balancer, or by a mechanical or electronic arm.

Finally, an improvement to conventional wheel balancers to aid in the actual placement of imbalance correction weights onto the wheel rim is disclosed in WO Patent No. 98/10261 to Snap-on Equipment Europe Limited for "A Wheel Balancer", herein incorporated by reference. Specifically, the WO 98/10261 patent discloses a conventional wheel balancer having an AC drive motor, which requires the operator to input two imbalance correction planes manually, and which includes a laser light source for illuminating a spot of laser light on the wheel rim, in each of the imbalance correction planes identified by the operator, at the specific angular location for placement of the respective imbalance correction weights. The laser light dot formed on the inner surface of the wheel rim indicates the angular center line of the balance weight position, and an inner edge of the balance weight position, thereby indicating to the operator the precise position at which the imbalance correction weight is to be secured to the wheel rim. The disclosed system assumes that each imbalance correction weight is of a predetermined average width. Furthermore, the laser light dot is only displayed when the operator manually rotates the wheel rim/tire assembly such that the weight application point coincides with a predetermined weight application rotational position, such as the four o'clock position. If the wheel rim/tire assembly is rotated away from the predetermined weight application rotational position, either by the operator or by it's own weight, the projected laser spot is turned off, preventing misplacement of the weight by the operator. However, since the rotation of the wheel rim/tire assembly to the predetermined weight application position is performed manually, it is difficult for an operator to maintain the wheel in the predetermined rotational position such that the laser light spot remains on while the correction weight is being applied, or the location is being cleaned of debris. Any slight movement of the wheel rim/tire assembly away from the predetermined rotation position results in the laser light spot being turned off, with no indication on the wheel to the operator in which direction the wheel must be rotated to restore the laser projected spot.

Accordingly, there is a need in the industry for a vehicle wheel balancer which facilitates the placement of imbalance correction weights to a wheel rim/tire assembly by eliminating or reducing the sources of operator error induced by the selection of correction weight balance planes, rotational positioning of the wheel rim/tire assembly for the application of the imbalance correction weights, and during the actual attachment of the imbalance correction weight to the wheel rim/tire assembly, through automation and improved operator guidance.

BRIEF SUMMARY OF THE INVENTION

Briefly stated, the improved wheel balancer of the present invention includes a shaft adapted for receiving a wheel rim/tire assembly, a rotation sensor assembly for measuring rotation of the shaft about its longitudinal axis, and a motor operatively connected to the shaft for rotating the shaft about its longitudinal axis, thereby rotating the wheel rim/tire assembly. A control circuit controls the application of current to the motor to rotate the wheel rim/tire assembly at desired speeds and to actively hold the wheel rim/tire assembly at desired rotational positions. An automatic measuring apparatus is configured to scan the inner surface of the wheel rim/tire assembly to provide the balancer computer with contour information necessary to identify optimal correction weight plane optimum locations as well to present the operator with the best imbalance correction weight arrangement. The best plane locations, amount of correction weight, the number of correction weights, and the positions of the correction weights in the plane locations, are calculated by the balancer computer to result in a minimized residual static and dynamic imbalance while still using incrementally sized weights. Once the correction planes and rotational positions of the imbalance correction weights is identified, the balancer computer utilizes the motor drive to automatically index and hold the wheel rim/tire assembly at the proper rotational position for placement of the first imbalance correction weight, enhancing weight placement accuracy. To further enhance weight placement accuracy, a laser pointer assembly projects a laser dot onto the inner surface of the wheel rim/tire assembly at the axial position of the weight imbalance correction plane at which the imbalance correction weight is to be applied. The wheel rim/tire assembly is rotated automatically by the drive motor to each determined rotational position for application of successive correction imbalance weights, and the laser dot is correspondingly projected onto each imbalance correction plane in succession.

It is a further improvement over the prior art in that the wheel balancer of the present invention that the balancer computer is configured to permit placement of imbalance correction weights adjacent the outer lip of the wheel rim/tire assembly, and that the laser pointer assembly is configured to project a laser spot between spokes of the wheel rim/tire assembly to illuminate the proper spot for placement of such imbalance correction weights.

It is a further improvement over the prior art in that the wheel balancer of the present invention is configured to receive as input, the width of a variety of brands of imbalance correction weights, and to utilizes such input widths to adjust the identification of the placement location of individual imbalance correction weights on the wheel rim/tire assembly to provide for optimal imbalance correction, and to indicate the adjusted position using the laser pointer.

The foregoing and other objects, features, and advantages of the invention as well as presently preferred embodiments thereof will become more apparent from the reading of the following description in connection with the accompanying drawings.

BRIEF DESCRIPTION OF THE SEVERAL VIEWS OF THE DRAWINGS

In the accompanying drawings which form part of the specification.

Corresponding reference numerals indicate corresponding parts throughout the several figures of the drawings.

DESCRIPTION OF THE PREFERRED EMBODIMENT

The following detailed description illustrates the invention by way of example and not by way of limitation. The description clearly enables one skilled in the art to make and use the invention, describes several embodiments, adaptations, variations, alternatives, and uses of the invention, including what is presently believed to be the best mode of carrying out the invention.

Throughout the present invention, the term "spot" as used herein is intended to define the point of intersection between a beam of light, such as a laser, and a surface. For purposes of this description, such a point of intersection is considered to have zero dimensions. The term image, as used herein, is intended to define a projection onto a surface having at least one dimension, such as a line segment, which is distinguished from a spot.

Figure 1:
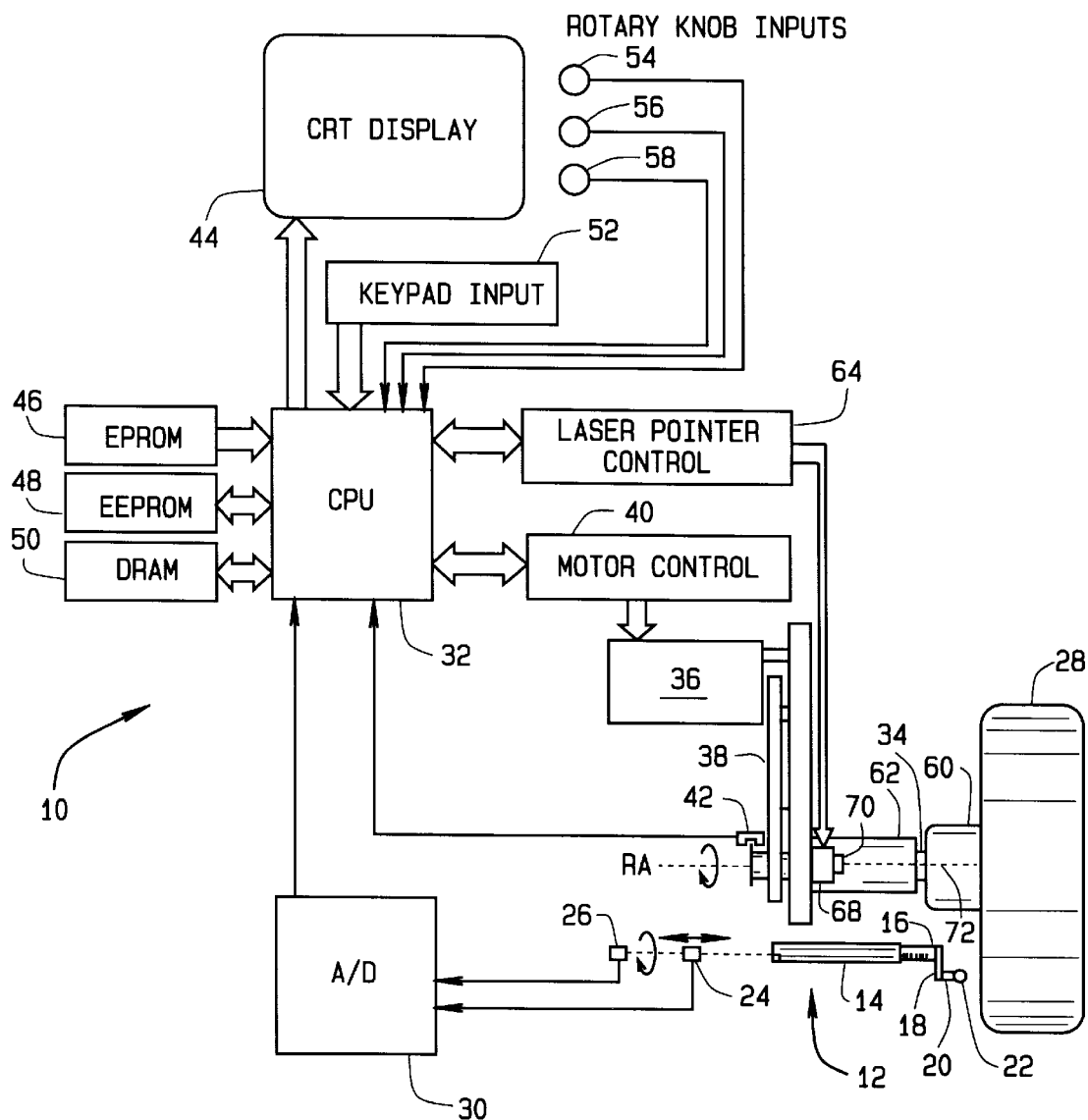
FIG. 1 is a combination diagrammatic plan view, block function diagram of the present invention system.

Turning to the drawings, FIG. 1 illustrates the mechanical aspects of the automatic measuring and correction weight placement wheel balancing apparatus 10 used for the present invention. An automatic rim measuring component 12 comprises a support tube 14 housing an longitudinally extendible and rotatable shaft 16. The specific details of construction and operation of the rim measuring component 12 are set forth in U.S. Pat. No. 5,915,274 incorporated herein by reference. The rim measuring component 12 comprises a radius arm 18 fixed to an end of the shaft 16. The other end of the radius arm 18 has a fixed spacer 20 and a spherical "pointer ball" 22. Pointer ball 22 is made of nylon or the like, and used by the operator to slide across inner wheel surfaces in a wheel profile scanning mode. The support tube 14 is welded to a bracket which provides the mounting for the apparatus in the wheel balancer 10, which houses a longitudinal movement transducer 24 which is preferably a rotary linear Hall Effect sensor driven by longitudinal movement of shaft 16. The bracket also houses a rotational transducer 26, also preferably a rotary linear Hall Effect sensor, which is similarly directly driven by movement of shaft 16. It should be noted that with the exception of the pointer ball 22 design and the direct driving of the rotational sensor 26, this mechanical arrangement is a well-known, durable, and cost effective design already used in balancers manufactured by the assignee, Hunter Engineering Company.

The automatic rim measuring component 12 is mounted with its longitudinally extendible shaft 16 parallel with the axis of rotation RA for the vehicle wheel rim/tire assembly 28 undergoing balancing. The automatic rim measuring component 12 is shown in the plan view with the radius arm 18 rotated slightly away from the downward rest position. The longitudinal sensor 24 senses instantaneous distances relative to the balancer as the shaft 16 is extended into the wheel rim/tire assembly 28 while the rotational sensor 26 senses instantaneous radii as the pointer ball 22 is placed in contact with inner surfaces of the wheel rim/tire assembly 28. Output signals from both sensors 24, 26 are fed into an A/D (analog to digital) converter 30 which is preferably an Analog Devices AD7871 fourteen (14) bit converter, and transferred to the wheel balancer central processing unit (CPU) 32 for further processing and utilization.

Vehicle wheel rim/tire combinations 28 to be balanced are mounted on a rotatable mounting shaft or spindle 34, which is driven by a bi-directional, multi-rpm, variable torque motor drive 36 through a belt 38. Operation of the motor drive 36 is controlled by a motor control unit 40, in response to signals received from the CPU 32. For details on the drive motor configuration and operation, refer to WO Patent No. 97/28431, incorporated by reference herein.

Mounted on one end of the spindle 34 is a conventional quadrature phase optical shaft encoder 42 which provides rotational position information to the balancer CPU 32, which is preferably a Texas Instruments TMS34010 graphics processing chip, capable of executing the balancer software and at the same time driving the CRT display 44. The CPU 32 is connected to EPROM program memory 46, EEPROM memory 48 for storing and retrieving non-volatile information such as calibration and vehicle specific specifications, and DRAM memory 50 for temporary storage. Manual inputs for the present invention entail keypad entry 52 as well as three digital rotary contacting encoders 54, 56, and 58 of type ECLODC24BD0006 by Bournes Inc.

During the operation of wheel balancing, at the other end of spindle 34, a wheel rim/tire assembly 28 under test is removably mounted for rotation with a spindle hub 60 of conventional design. To determine wheel rim/tire assembly imbalances, the balancer includes at least a pair of force transducers coupled to balance structure 62. These sensors and their corresponding interface circuitry to the CPU 32 are well known in the art, such as seen in U.S. Pat. No. 5,396,436 to Parker et al., herein incorporated by reference, and thus are not shown.

Figure 2:
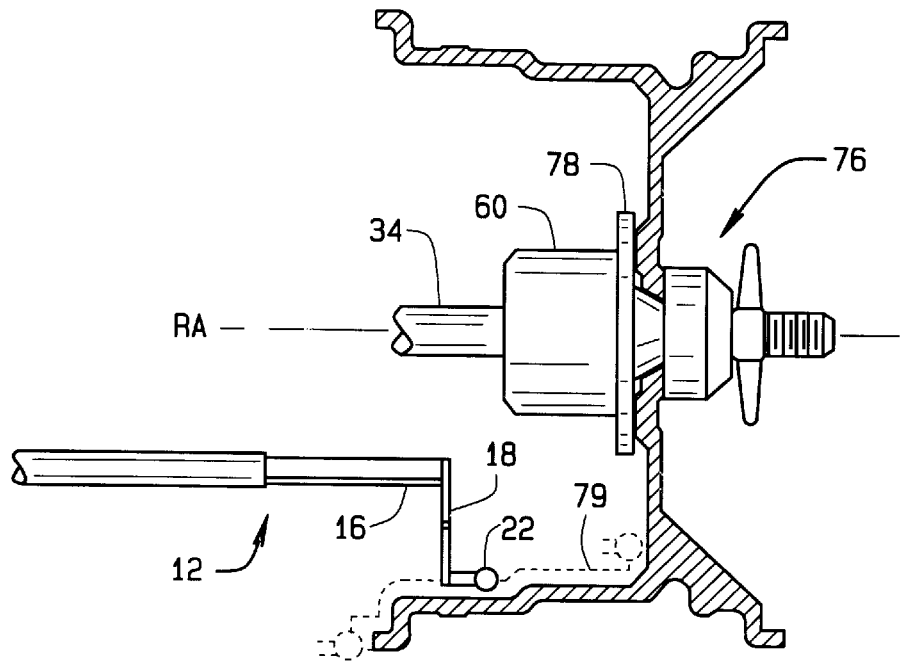
FIG. 2 is a combination cross section, diagrammatic illustration showing a typical wheel mounted on a wheel balancer and how a rim measuring apparatus is used to scan a wheel surface contour to obtain the entire continuous surface profile available for the placement of imbalance correction weights.

Additionally shown in FIG. 1 is the inclusion of the laser pointer control unit 64 in communication with the balancer CPU 32 for controlling the operation of a laser pointer 66. The laser pointer 66 is preferably housed in a self-contained laser housing 68, with a conventional laser emitter 70 positioned on an actuator to project a beam of laser light 72 towards the wheel rim/tire assembly 28 mounted on the spindle 34. As best seen in FIG. 2, the laser emitter 70 is mounted within the housing 68 on an actuator 74 configured to move the laser emitter 70 such that the laser beam 72 intersects the inner surface of the wheel rim/tire assembly 28 at any point between the inner and outer faces thereof within a predetermined radial sector. Preferably, the laser beam 72 is projected parallel to the axis of rotation of spindle 34, intersecting the wheel rim/tire assembly 28 radially, however it will be readily apparent that by controlling movement of the laser emitter 70, the laser beam 72 may be projected onto the surface of the wheel rim/tire assembly 28 at an oblique angle. The point of intersection between the laser beam 72 and the wheel rim/tire assembly 28 is preferably illuminated by a spot of light caused by the scattering and reflecting of the laser beam 72.

Utilizing the wheel balancing apparatus 10 of the present invention to balance a wheel rim/tire assembly 28 involves the following basic steps:

Mount the wheel rim/tire assembly 28 on the spindle 34;

input the wheel rim/tire assembly 28 profile with the rim measuring component 12;

measure the imbalance in the wheel rim/tire assembly 28;

identify the imbalance correction planes (axial distances) for placement of imbalance correction weights;

identify the angular position for placement of imbalance correction weights within each imbalance correction plane (i.e. at each axial distance);

illuminate imbalance correction plane; and attach imbalance correction weights to the wheel rim/tire assembly 28 at a predetermined rotational position of the wheel rim/tire assembly 28. The first step in balancing the wheel rim/tire assembly 28, mounting on the spindle 34, is conventional and well known in the prior art, and is not described herein in detail. The second step, inputting the wheel rim/tire assembly 28 profile utilizing the rim measuring component 12 is described in general with reference to FIG. 2. A detailed description is set forth in the incorporated reference of U.S. Pat. No. 5,915,274. FIG. 2 illustrates the process of inputting the wheel profile or rim contour. A typical wheel rim is shown mounted with conventional mounting hardware 76, clamped against the face plate 78 of the mounting hub 60. The rim measuring apparatus 12 is mounted as close to the spindle 34 centerline RA as possible while still allowing the extension shaft 16 to clear the mounting hub face plate 78. To scan the wheel profile the operator first extends and positions the pointer ball 22 to the farthest distance as physically possible. The CPU 32 recognizes the extension of the pointer ball 22 as a desire to initiate a scan, transmits a confirmation beep, and waits for the apparatus to be held steady. After the apparatus is held steady for approximately 1 second, a beep is transmitted to signal the operator to begin the scan. The pointer ball 22 is dragged along path 79 against the wheel rim surface, following the contour all the way to the point where the pointer ball 22 contacts the tire or rim edge, at which point the ball 22 is again held steady and the CPU 32 responds with a confirmation beep that the scan is finished, storing sets of distances and diameters, and the apparatus can be returned to the storage position. A right plane measuring apparatus (not shown) capable of reaching the right side of the wheel rim may optionally be provided with the present invention. Like the rim measuring apparatus described above, it could be a variation of an existing proven design such as the "Double Dataset™" apparatus offered on existing wheel balancers manufactured by Hunter Engineering Company. The surfaces suitable for adhesive weights and the right rim location will be scanned in exactly the same manner as the left side of the wheel, providing an even more complete wheel profile.

Figure 3:
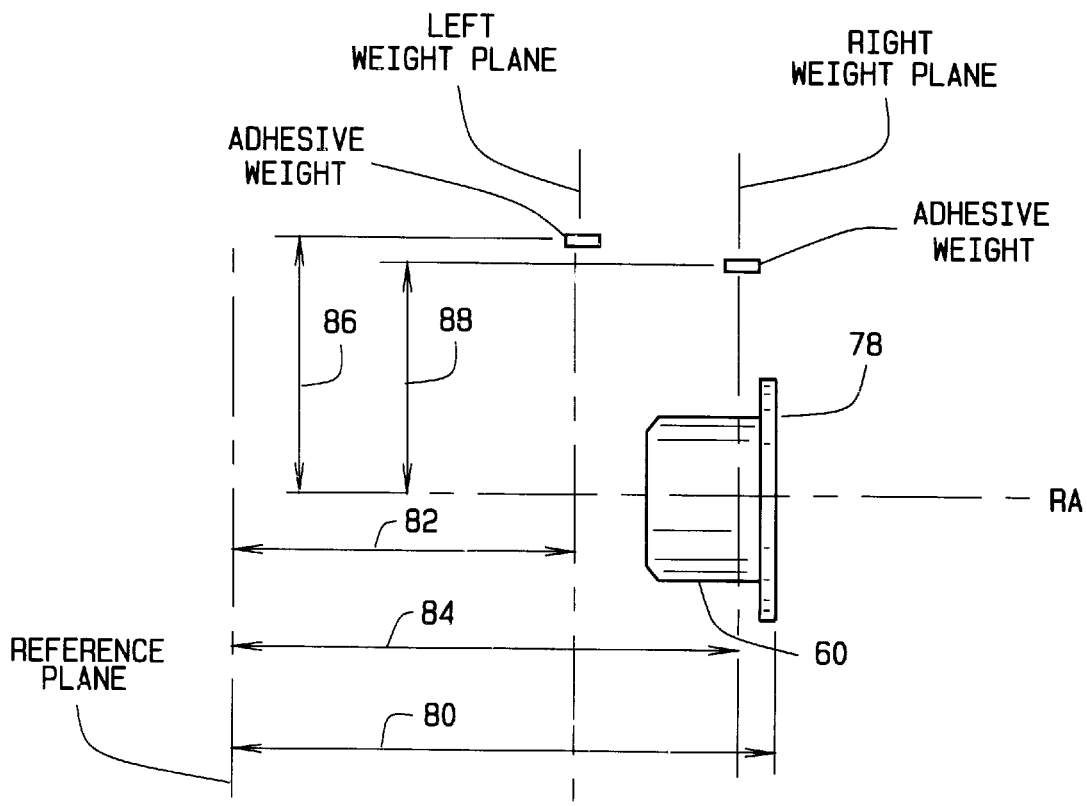
FIG. 3 is in the view of FIG. 2, showing the geometric relationships between imbalance and correction weight locations residing on weight correction planes.

FIG. 3 shows an example weight plane arrangement that could be obtained from any of the distance/diameter data sets from the wheel scanning step. The plane locations are simply distances from some fixed reference plane known to the balancer. In this case the reference plane is an imaginary fixed offset 80 from the face 78 of the mounting hub 60, which yields positive values in mm units along any measurable point reachable by the measuring apparatus. With a particular measured static and couple imbalance obtained from a measurement spin and with a particular set weight plane locations 82, 84 and corresponding radii 86, 88, the balancer CPU 32 determines the required weight amount and radial placement angle for a weight in each plane. Because this step by itself is not novel to the art, the actual math involved is not required here. For a full explanation of the math performed during this weight calculation, refer to incorporated U.S. Pat. No. 5,396,436 to Parker et al.

By the CPU 32 determining the plane locations instead of the operator, two problems with adhesive weight balancing are solved. First, the imbalance correction planes were located as far apart as possible which in the case of dynamic imbalance can greatly reduce the amount of weight required, and second, the possibility of the operator selecting a balance plane displacement which will result in the need for an imbalance correction weight of an unavailable increment is eliminated.

An additional feature provided by the present invention is the ability to automatically index the wheel assembly to the proper angular location for placing a weight. The motor control of FIG. 1 has the ability to controllably rotate the wheel rim/tire assembly 28 to any rotational position desired and actively hold that position, overcoming all the aforementioned problems associated with mechanical and electrical braking schemes as well as eliminating the step of manually positioning the wheel. After a spin, the CPU 32 causes the motor control 40 to position the wheel rim/tire assembly 28 for placement of an imbalance correction weight in the left plane weight. After the imbalance correction weight is applied, the wheel rim/tire assembly 28 is then rotated to the right imbalance correction plane weight placement position by the motor control 40, initiated by one of three methods: a manual input such as a key press on the keypad 52, movement of the rim measuring apparatus 12 to where the pointer ball 22 is in closer proximity to the right plane than to the left plane, or if the wheel rim/tire assembly 28 is pushed with enough predetermined force that the CPU 32 understands that the operator must want the wheel rim/tire assembly 28 to move to the next position. For a more complete description of the servo drive and wheel rotational position control, refer to the incorporated reference WO Patent No. 97/28431. For the method where a measurement device initiates the servo change, the operator is presented with the unique ability of not having to look at the display at all except for noting and selecting the required weights after a spin.

Figure 4:
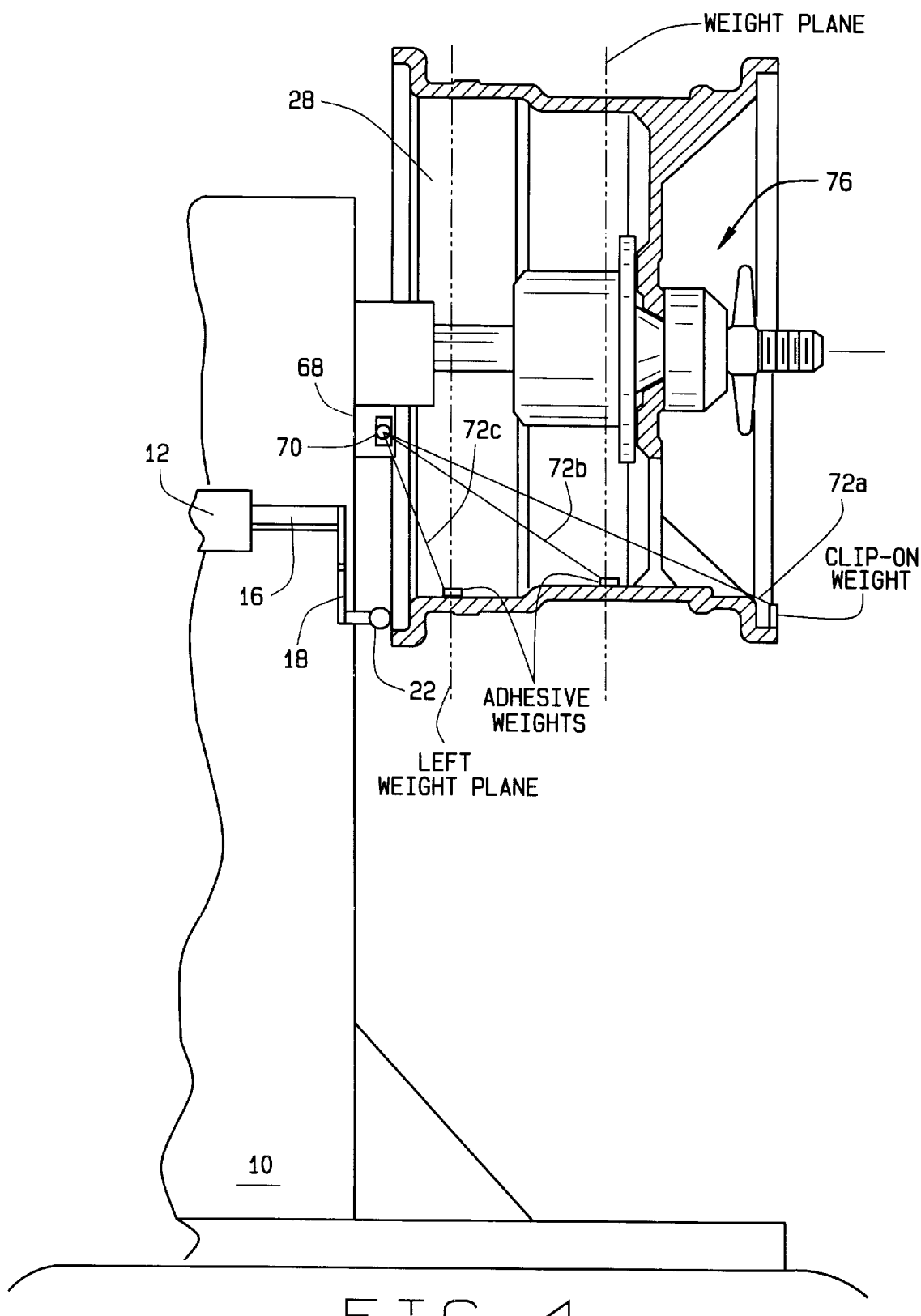
FIG. 4 is a combination cross section, diagrammatic illustration similar to FIG. 2, showing how the laser pointer is used to facilitate the placement of imbalance correction weights in the imbalance correction planes and on the front edge of the wheel rim/tire assembly, by projecting a laser beam between spokes of the wheel rim/tire assembly.

A further feature of the wheel balancer of the present invention is the inclusion of a motion-controlled laser emitter 70, movable along at least one axis parallel to the axis of rotation for the wheel rim/tire assembly, and the laser pointer control 64 to further facilitate the proper placement of the imbalance correction weights by the operator. As seen in FIG. 4, upon identification by the CPU 32 of the wheel balancer of the two imbalance correction planes, the laser emitter 70 is activated by the laser pointer control 64 to project a beam of laser light 72 along one of several paths indicated generally by 72A–72C such that the laser beam 72 intersects the wheel rim/tire assembly 28 at a point on or adjacent one of the imbalance correction planes, thereby illuminating it. Actuation of the laser emitter 70 is independent of the rotational position of the wheel rim/tire assembly 28, as proper rotational position of the wheel rim/tire assembly 28 is maintained by the motor control 40, as described above, such that the attachment point for the imbalance correction weight coincides with the laser beam 72 projection point on the wheel rim/tire assembly 28. Accordingly, the laser emitter 70 emits laser beam 72 continuously until an imbalance correction weight is installed at the indicated imbalance correction plane, and the operator signals the wheel balancer 10 to proceed with the next step in the imbalance correction process, at which point laser beam 72 may be emitted along a second path such as 72B or 72C.

In FIG. 4, laser beam 72 emitted along path 72A is seen to pass between the spokes of the wheel rim/tire assembly 28, and intersect the wheel rim/tire assembly 28 at a point adjacent the front face thereof, identifying a position at which a clip-on style imbalance correction weight is to be attached to the wheel rim/tire assembly 28. Alternative paths, 72B and 72C for the laser 72 indicate possible projection paths for the laser 72 wherein the laser pointer 68 is illuminating the right and left imbalance correction planes for a pair of adhesive imbalance correction weights. Laser paths 72A, 72B, and 72C are considered to be exemplary of the infinite possible paths along which the laser beam 72 may be projected to intersect the surface of the wheel rim/tire assembly, and those of ordinary skill in the art will recognize that the location of the right and left imbalance correction planes may vary from those shown in FIG. 4, and that the angle along which the laser beam 72 is projected may similarly be varied to intersect the wheel rim/tire assembly 28 at a different point about the inner circumference thereof.

In contrast, the incorporated prior art reference, WO Patent No. 98/10261 only actuates a laser light source when the wheel rim/tire assembly is exactly positioned manually by the operator to the identified rotational position. If the wheel rim/tire assembly of the WO 98/10261 patent is moved from the identified rotational position, the laser light source is deactivated until such time as the wheel rim/tire assembly is returned to the identified rotational position.

In an alternative embodiment, CPU 32 of the present invention is provided with information identifying the type of imbalance correction weight being utilized, or with the width of the imbalance correction weight, either by the operator or from a database, the CPU 32 will direct the laser pointer control 64 to offset the point of intersection between the laser beam 72 and the wheel rim/tire assembly 28 by an amount such that the center of the imbalance correction weight will intersect the imbalance correction plane if an edge of the imbalance correction weight is placed at the intersection point indicated by the laser beam 72.

Figure 5:
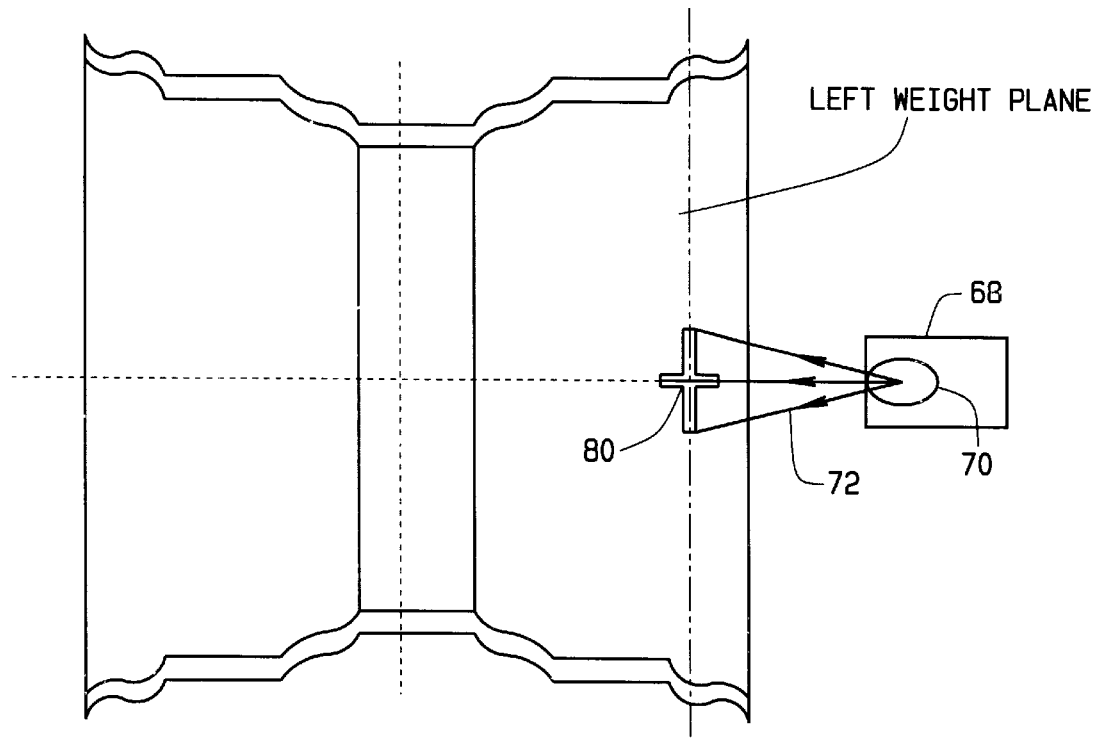
FIG. 5 is a sectional view of the inner surface of a wheel rim/tire assembly, illustrating an alternate embodiment laser projection illuminating the length and width of an imbalance correction weight.
Figure 6:
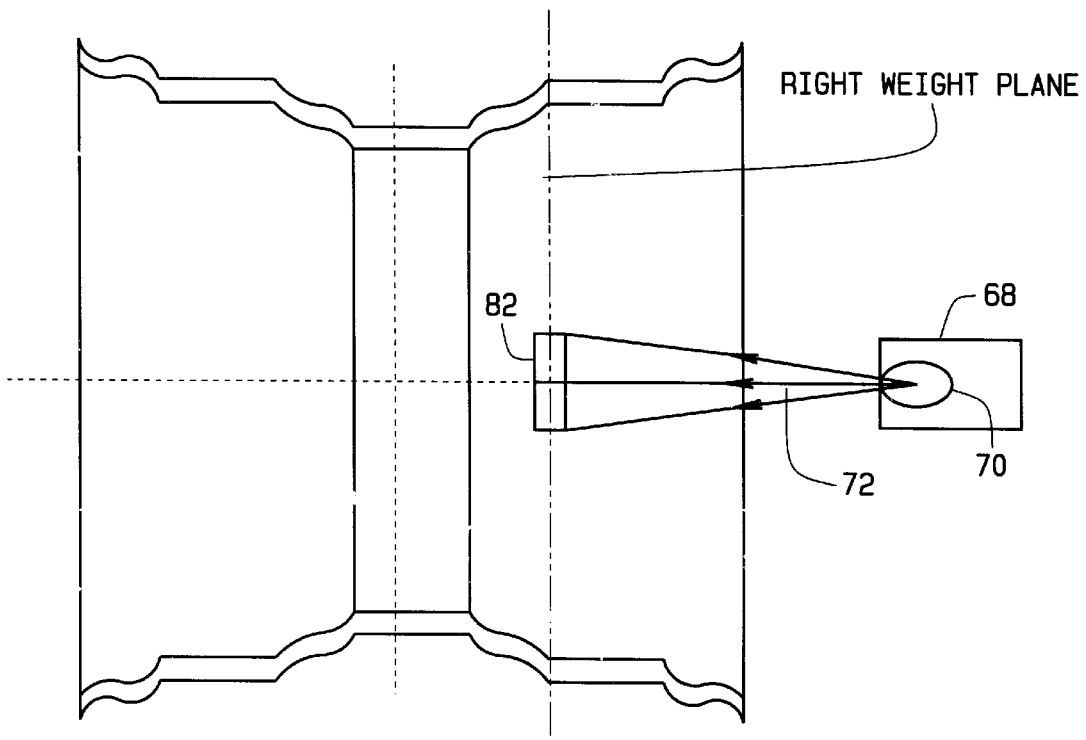
FIG. 6 is a sectional view of the inner surface of a wheel rim/tire assembly, illustrating an alternate embodiment laser projection illuminating the outline of an imbalance correction weight.
Figure 7:
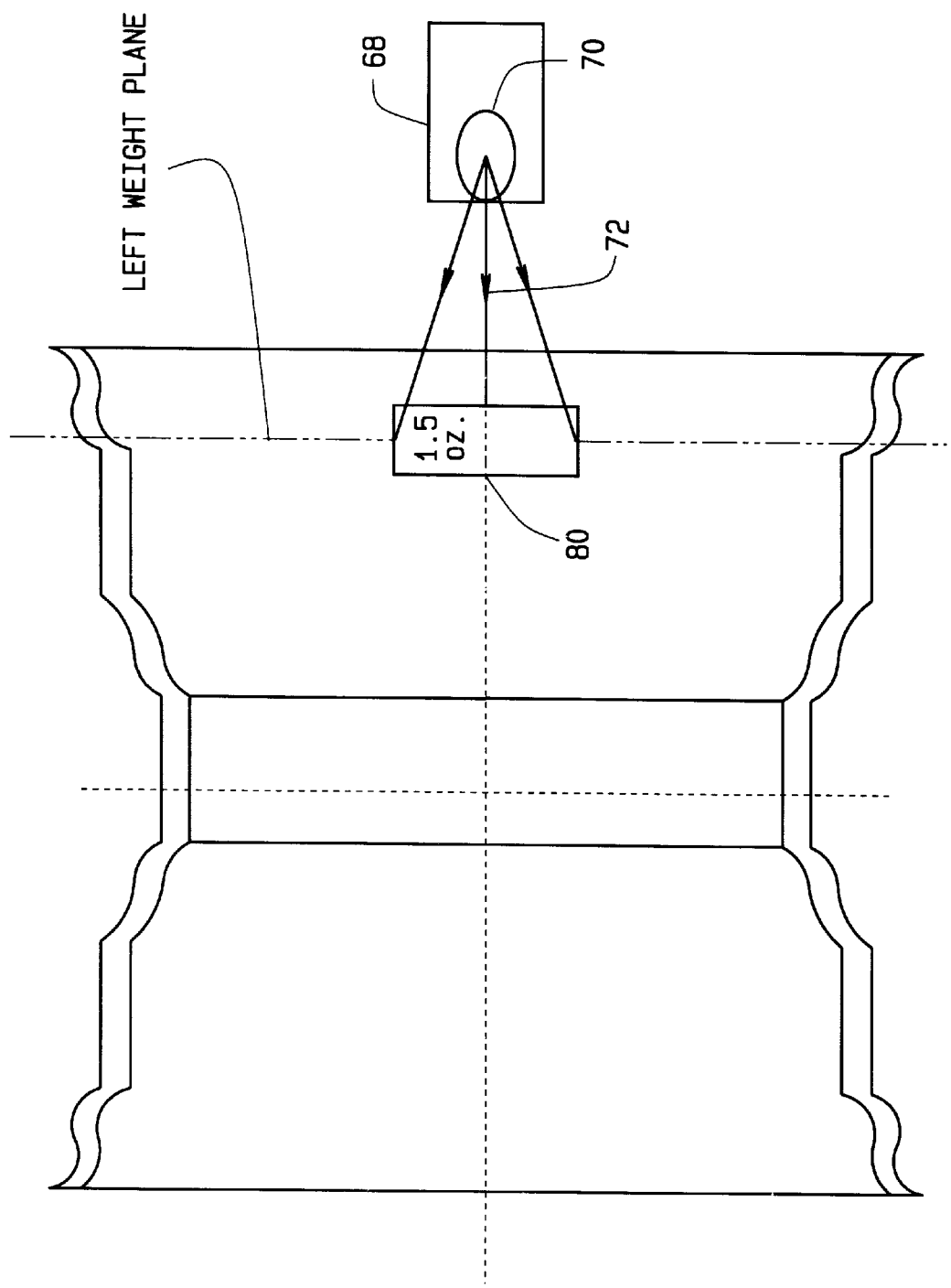
FIG. 7 is a sectional view of the inner surface of a wheel rim/tire assembly, illustrating an alternate embodiment laser projection illuminating the outline of an imbalance correction weight and displaying an alphanumerical message.

Turning to FIGS. 5–7, it will be seen that motion of the laser beam 72 may be controlled in multiple axes to provide a visual indication (i.e. an image) of one or more dimensional measurements of, or an outline of, the imbalance correction weight to be applied at the imbalance correction plane. Specifically, as seen in FIG. 5, through rapid motion (i.e. dithering) directed by the laser pointer control 64, the laser beam 72 may be directed to outline or form a cross-hair pattern 80 on the wheel rim/tire assembly 28, wherein the center of the cross-hair pattern 80 indicates the computed placement location for the imbalance correction weight relative to the imbalance correction plane, and the length of the arms of the cross-hair 80 correspond to the length and width (i.e. dimensions) of the imbalance correction weight if such information is known to the central processing unit 32, or to the size of a generic weight if the imbalance correction weight dimensions are not known. Alternatively, the laser beam 72 may be directed by the laser pointer control 64 to project a line (by dithering) on the inner surface of the wheel rim/tire assembly corresponding to either the width or the length of an imbalance correction weight, centered on the imbalance correction plane.

Similarly, as is seen in FIG. 6, the laser pointer control 64 may direct the laser beam 72 to outline a perimeter within which the imbalance correction weight is to be secured in the imbalance correction plane. Again, if the dimensions of the imbalance correction weight are known, the perimeter may be controlled to correspond to the known dimensions, or merely to be representative of a generic imbalance correction weight size. Those of ordinary skill in the art will recognize that the laser pointer control 64 may be configured to rapidly move (i.e. dither) the laser beam 72 in a variety of predetermined patterns on the surface of the wheel rim/tire assembly, including the display of alphanumeric messages, as seen in FIG. 7, thereby projecting an image or message to the operator. For example, in FIG. 7, the outline of an imbalance correction weight is projected onto the surface of the wheel rim/tire assembly, together with an alphanumeric message identifying the proper imbalance correction weight amount. As is well understood in the art, movement of the laser beam 72 of sufficient speed will create the optical illusion to a human operator of a continuous projected image on the surface of the wheel rim/tire assembly, in much the same way as a television image is refreshed sufficiently fast for the human eye to incorporate a complete image from a single scanning beam.

An additional feature of the present invention is the interaction between the motor control 40 and the laser pointer control 64 through the CPU 32 of the wheel balancer 10. For example, if the operator desires to place an imbalance correction weight in a different imbalance correction plane than that selected by the CPU 32 and indicated by the laser emitter 70, the angle of the laser beam 72 may be manually adjusted through the use of the rotary knob inputs 54–58 to identify to the CPU 32 the desired imbalance correction plane. The CPU 32 will calculate a new weight magnitude, correspondingly update the rotational position of the wheel rim/tire assembly 28 to which an imbalance correction weight must be applied, and direct the motor control 40 to servo the wheel rim/tire assembly 28 to the new rotational position, corresponding to the operator selected imbalance correction plane. The ability to over-ride the CPU-selected imbalance correction planes is of particular importance when the operator, upon visual inspection of the wheel rim/tire assembly 28, identifies a surface defect at the CPU-selected weight application point, resulting in the need to adjust at least one weight placement location(s).

An alternate embodiment utilizing adjustment of the laser pointer by the operator allows for the calibration of the laser pointer control 64 to the size of a predetermined imbalance correction weight. An imbalance correction weight of a known weight amount is placed on the wheel rim/tire assembly surface, and the position of the laser pointer adjusted by the operator using the rotary knob inputs 54–58 until the laser beam outlines the perimeter of the imbalance correction weight, or traces a line corresponding to the length of the imbalance correction weight. Once the laser beam 72 is adjusted to correspond to the imbalance correction weight, the operator signals the central processing unit 32, preferably through the keypad input 52, and the dimensions of the imbalance correction weight, as identified from the laser pointer adjustments, are stored for future reference. The operator may further provide the central processing unit 32 with sufficient information to identify a uniform imbalance correction weight dimension increase which is proportional to an increase in the weight of the imbalance correction weight, such that the central processing unit 32 can compute the proper dimensions of any amount of imbalance correction weight to be applied to the inner surface of the wheel rim/tire assembly, and correspondingly direct the laser pointer control 64 to project laser beam 72 in the proper pattern. For example, if the operator identifies the size of a 0.25 oz. weight using the laser pointer, and subsequently identifies the size of a 0.50 oz. weight, wherein only the length of the weight has increased (i.e. doubled), the central processing unit can interpolate that the size of larger weights of the same brand (i.e. a 1.0 oz weight would be 4× as long as the 0.25 oz. weight).

A further additional feature of the present invention is the ability of the laser pointer 68 to illuminate weight attachment points adjacent the front face of the wheel rim/tire assembly 28, as shown by laser beam path 72a in FIG. 4, and for the CPU 32 to perform a "reverse split-spoke" calculation to facilitate the placement of weights on the front face of the wheel rim/tire assembly when the laser beam 72 is blocked from illuminating the attachment point by a spoke of the wheel rim/tire assembly 28. As is known by those of ordinary skill in the art, a technique utilized in balancing is a "split-spoke" calculation, which is performed to distribute the placement of adhesive imbalance correction weights about the inner circumference of a wheel rim, at locations which are hidden from view at the front of the vehicle wheel, by locating the imbalance correction weights behind the spokes of the wheel rim/tire assembly. Such techniques are disclosed in U.S. Pat. No. 5,591,909 to Rothamel et al. and U.S. Pat. No. 4,357,832 to Blackburn et al. In contrast, to perform a "reverse split-spoke" calculation, the operator of the present invention wheel balancer provides an indication to the CPU 32 of the desired spacing required to shift the laser point to points between the spokes of the wheel rim/tire assembly 28, as is described in connection with the "split-spoke" calculation in U.S. Pat. No. 5,355,729 to Douglas for "Split Weight Balancing", herein incorporated by reference. The CPU 32 next identifies a combination of incremental imbalance correction weights which may be placed adjacent the front face of the wheel rim/tire assembly 28 between the spokes of the wheel rim/tire assembly 28 at the indicated spacing, and which is the equivalent of a single imbalance correction weight placed in front of a spoke. Alternatively, the operator may enter a "spoke-input" mode in the wheel balancer 10, and identify to the central processing unit 32 the number, size, and radial placement of the individual spokes of the wheel rim/tire assembly, thereby allowing the central processing unit to automatically determine if the laser beam 72 will be blocked by a spoke and identify an acceptable split-weight substitution which allows the laser beam 72 to reach the outer wheel rim edge.

By identifying a combination of incremental imbalance correction weights positioned between the spokes of the wheel rim/tire assembly 28, the laser pointer 70 is directed by the laser pointer control 64 to illuminate placement points adjacent the front face of the wheel rim/tire assembly 28 along a path such as 72a shown in FIG. 4, between the spokes. Such illumination may be as described above, or in an alternative embodiment, the laser beam 72 may be controlled by the laser pointer control 64 to sweep along the surface of the wheel rim/tire assembly in a plane perpendicular to the wheel axis of rotation, and project a line guiding the operator the proper imbalance correction weight placement angular location.

In an alternate embodiment, those of ordinary skill in the art will readily recognize the projection of laser beam 72 need not be directed towards the inner surface of the wheel rim/tire assembly, but may be projected directly onto the sidewall of the tire mounted to the wheel rim. Projection of the laser beam 72 onto the sidewall of the tire itself is particularly useful for identifying the location at which the operator is required to install a clip-on weight. Due to the difficulty of viewing the wheel rim/tire assembly 28 mounted to the balancer 10 from directly above, it is difficult for an operator to properly position a clip-on weight for installation. By positioning the laser pointer 68 above the spindle 62, the laser beam 72 may be directed by the laser pointer control 64 to project an arrow onto the tire inner (or left) sidewall at the 12:00 position, indicating the top dead center of the wheel rim/tire assembly, thereby facilitating the placement of a clip-on imbalance correction weight to the wheel rim/tire assembly edge at the inner imbalance correction plane location, and eliminating a common source of operator error. Those of ordinary skill in the art will recognize that through the use of either a second laser point 68, or by reflection, the laser beam 72 may be similarly directed to project images onto the outer (or right) sidewall of the wheel rim/tire assembly to facilitate the placement of clip-on weights in the outermost imbalance correction plane.

In view of the above, it will be seen that the several objects of the invention are achieved and other advantageous results are obtained. As various changes could be made in the above constructions without departing from the scope of the invention, it is intended that all matter contained in the above description or shown in the accompanying drawings shall be interpreted as illustrative and not in a limiting sense.

What is claimed is:

1. An improved method of correcting imbalance in a wheel assembly including a rim and a tire, comprising:

mounting a wheel assembly to be balanced on a rotatable shaft of a wheel balancer, said wheel balancer having a rim measuring apparatus for measuring an inner profile of the wheel assembly;

scanning a contour of said wheel assembly to determine at least one correction weight placement imbalance plane;

sensing imbalance of said wheel assembly and an associated rotational position for placement of at least one correction weight to correct said imbalance;

continuously illuminating said at least one correction weight placement imbalance plane at a predetermined rotational position;

sensing a rotational position of said wheel assembly;

automatically indexing said wheel assembly using said sensed rotational position such that the correction weight placement associated rotational position corresponds to said predetermined rotational position for application of the correction weight; and automatically maintaining said wheel assembly at said predetermined rotational position for application of said correction weight.

2. The improved method as set forth in claim 1 further including the steps of:

determine a second correction weight placement imbalance plane from said scanning step;

continuously illuminating said second correction weight placement imbalance plane at said predetermined rotational position;

automatically indexing said wheel assembly so that a second correction weight placement rotational position corresponds to said predetermined rotational position for application of said second correction weight; and automatically maintaining said wheel assembly at said predetermined rotational position for application of said second correction weight.

3. The improved method as set forth in claim 2 wherein the steps of automatically indexing and automatically maintaining said second rotational position and illuminating said second correction weight placement imbalance plane are initiated responsive to receipt of a manual input.

4. The improved method as set forth in claim 2 wherein the steps of automatically indexing and automatically maintaining said second rotational position and illuminating said second correction weight placement imbalance plane are initiated responsive to an automatic detection of weight placement.

5. The improved method as set forth in claim 1 wherein responsive to said at least one correction weight placement imbalance plane corresponding to an outer edge of said wheel assembly, said step of continuously illuminating said weight placement imbalance plane comprising illuminating a segment of said wheel assembly parallel to an axis of rotation of said wheel assembly, said illuminated segment intersecting said outer edge at a predetermined rotational position of said wheel assembly.

6. The improved method as set forth in claim 1 wherein said step of continuously illuminating said correction weight placement imbalance plane at said predetermined rotational position comprises projecting an image having at least one dimension onto said wheel assembly.

7. The improved method as set forth in claim 6 wherein said projected image is alphanumeric.

8. The improved method as set forth in claim 6 wherein said projected image is an outline of an imbalance correction weight.

9. The improved method as set forth in claim 6 wherein said projected image corresponds to at least one dimensional measurement of an imbalance correction weight.

10. The improved method as set forth in claim 9 wherein said at least one measurement is length.

11. In a wheel balancer having a shaft adapted for receiving a wheel assembly including at least a rim, said shaft having a longitudinal axis and being rotatable about said axis so as to rotate said wheel assembly removably mounted thereon; a rim measuring apparatus configured to measure a profile of the wheel assembly; a sensor assembly for measuring rotation of the shaft about said longitudinal axis; a motor operatively connected to the shaft for rotating said shaft about said longitudinal axis, thereby to rotate the wheel assembly; a control circuit for controlling said motor, said control circuit being connected to the sensor assembly and being responsive to the measured rotation of the shaft to control a rotational position of the wheel assembly; a second sensor assembly for measuring imbalance of the wheel assembly; and a central processing unit configured to utilize said wheel assembly profile and measured imbalance to determining the magnitude and application rotational position of a first correction weight in a first imbalance correction plane and the magnitude and application rotational position of a second correction weight in a second imbalance correction plane; the improvement comprising:

an imbalance correction plane illumination apparatus for illuminating a first point on a surface of said wheel assembly associated with said first imbalance correction plane and a second point on said surface of said wheel assembly associated with said second imbalance correction plane, said first and second points having a predetermined rotational position;

wherein said central processing unit is further configured to direct said control circuit to rotate said wheel assembly such that said first correction weight application rotational position coincides with said predetermined rotational position, to direct said control circuit to maintain said wheel assembly in such position, and to direct said imbalance correction plane illumination apparatus to continuously illuminate said first point associated with said first imbalance correction plane, and subsequently, to direct said control circuit to rotate said wheel assembly such that a second correction weight application rotational position coincides with said predetermined rotational position, to direct said control circuit to maintain said wheel assembly in such position, and to direct said imbalance correction plane illumination apparatus to continuously illuminate said second point associated with said second imbalance correction plane.

12. The improved wheel balancing apparatus of claim 11 wherein said imbalance correction plane illumination apparatus includes a manual adjustment for altering a location of at least one of said first or second illuminated points on said surface of said wheel assembly;

said central processing unit further configured, responsive to said altered location of at least one of said first or second illuminated points, to adjust at least said associated imbalance correction plane and at least said associated imbalance correction weight application rotational position.

13. The improved wheel balancing apparatus of claim 11 wherein said illuminating apparatus comprises a laser.

14. The improved wheel balancing apparatus of claim 13 wherein said laser is motion controlled about at least one axis.

15. The improved wheel balancing apparatus of claim 14 wherein said laser is motion controlled to illuminate an image having at least one dimension at each of said first and second points on said surface of said wheel assembly.

16. The improved wheel balancing apparatus of claim 15 wherein said image has a dimension corresponding to an imbalance correction weight dimension.

17. The improved wheel balancing apparatus of claim 15 wherein said image includes alpha-numerical symbols.

18. A method of determining imbalance correction weight locations for correcting imbalance in a vehicle wheel assembly including at least a wheel rim, comprising:

scanning the contour of a vehicle wheel assembly to be balanced;

obtaining imbalance data for said vehicle wheel assembly;

electronically determining at least one weight plane location for a correction weight from said scanned wheel contour and said imbalance data, said weight plane location corresponding to an axial position along said scanned wheel contour;

electronically determining at least one weight rotational position within said at least one weight plane location for said correction weight from said imbalance data, said weight rotational position corresponding to an angular position about an axis of rotation;

illuminating continuously a portion of said scanned contour of said vehicle wheel assembly at a predetermined weight application rotational position, said illuminated portion associated with said weight plane location;

automatically rotating said vehicle wheel assembly such that said at least one weight rotational position corresponds to a predetermined weight application rotational position; and automatically maintaining said vehicle wheel assembly at said rotated position for application of said correction weight.

19. The method of claim 18 wherein the step of electronically determining at least one weight plane location for a correction weight identifies a correction weight plane location for minimizing the amount of weight required to correct the imbalance of the vehicle wheel.

20. A method of assisting an operator in correcting vehicle wheel imbalance, comprising:

scanning the profile of a vehicle wheel to be balanced;

electronically displaying to the operator a graphical representation of the scanned profile;

obtaining wheel imbalance data;

providing a visual display of a correction weight plane location, a weight placement amount and a weight placement rotational position for at least a first correction weight to the operator to correct the wheel imbalance;

indexing the vehicle wheel such that the weight placement rotational position is at a predetermined rotational position for attachment of the correction weight;

illuminating the correction weight plane location on a surface of the vehicle wheel at the predetermined rotational position for attachment of the correction weight;

receiving operator input signals requesting a change in said correction weight plane location, weight placement amount, or weight placement rotational position;

re-indexing the vehicle wheel, in response to the operator requested change, such that the weight placement rotational position which would result from said operator request change is at said predetermined rotational position for attachment of the correction weight;

altering said illumination, in response to the operator requested change, of the correction weight plane location to correspond to a correction weight plane location which would result from said operator requested change; and applying a correction weight to the vehicle wheel.

21. A weight position identification system for use with a vehicle wheel balancer configured to measure the imbalance of a vehicle wheel assembly including at least a rim, mounted thereon, and to identify at least one imbalance correction weight axial position and an associated imbalance correction weight rotational position, comprising:

a laser pointer configured to continuously illuminate said at least one identified imbalance correction weight placement axial position;

a motor configured to rotate said vehicle wheel assembly such that said at least one identified imbalance correction weight rotational position corresponds to a weight application rotational position; and wherein said motor is further configured to maintain said vehicle wheel assembly at a desired rotational position for application of an imbalance correction weight.

22. The weight position identification system of claim 21 wherein said weight application rotational position is predetermined.

* * * * *

UNITED STATES PATENT AND TRADEMARK OFFICE
CERTIFICATE OF CORRECTION

PATENT NO. : 6,484,574 B1
DATED : November 26, 2002
INVENTOR(S) : Michael Douglas and Nicholas J. Colarelli, III It is certified that error appears in the above-identified patent and that said Letters Patent is hereby corrected as shown below:

Column 15,
Line 37, replace claim 19 with: The method of claim 18 wherein the step of electronically determining at least one weight plane location for a correction weight identifies a correction weight plane location for minimizing the amount of weight required to correct the imbalance of the vehicle wheel assembly.

Line 42, replace claim 20 with:

A method of assisting an operator in correcting vehicle wheel assembly imbalance, comprising:

scanning a contour of a vehicle wheel assembly to be balanced;

electronically displaying to an operator a graphical representation of said scanned contour;

obtaining vehicle wheel assembly imbalance data;

providing a visual display to said operator of a correction weight plane location, a weight placement amount and a weight placement rotational position for at least a first correction weight to adjust a vehicle wheel assembly imbalance represented by said imbalance data;

indexing said vehicle wheel assembly such that said weight placement rotational position is at a predetermined rotational position for attachment of said first correction weight;

illuminating continuously said correction weight plane location on a surface of said vehicle wheel assembly at said predetermined rotational position for attachment of said first correction weight;

receiving operator input signals requesting a change in said correction weight plane location, said weight placement amount, or said weight placement rotational position;

UNITED STATES PATENT AND TRADEMARK OFFICE
CERTIFICATE OF CORRECTION

PATENT NO. : 6,484,574 B1
DATED : November 26, 2002
INVENTOR(S) : Michael Douglas and Nicholas J. Colarelli, III It is certified that error appears in the above-identified patent and that said Letters Patent is hereby corrected as shown below:

re-indexing said vehicle wheel assembly, in response to said operator requested change, such that a new weight placement rotational position which would result from said operator request change is at said predetermined rotational position for attachment of said first correction weight;

altering said continuous illumination, in response to said operator requested change, of said correction weight plane location to correspond to a new correction weight plane location which would result from said operator requested change;

automatically maintaining said vehicle wheel at said re-indexed rotational position; and applying said first correction weight to said vehicle wheel assembly."

Signed and Sealed this

Twenty-sixth Day of August, 2003

JAMES E. ROGAN
*Director of the United States Patent and Trademark Office*